July 12, 1960 E. W. TAYLOR 2,945,086

CORRECTING FOR TRANSMISSION VARIATIONS IN COLOUR TELEVISION CHANNELS

Filed Dec. 14, 1956 2 Sheets-Sheet 1

Inventor
E. W. Taylor
By Glascock Downing Seebold
Attys

Inventor
E. W. Taylor
By Mason Kolehmainen? Downing & Seebold
Attys.

United States Patent Office 2,945,086 Patented July 12, 1960

2,945,086

CORRECTING FOR TRANSMISSION VARIATIONS IN COLOUR TELEVISION CHANNELS

Eric Wilfred Taylor, The Uplands, Gerrards Cross, England, assignor to Electric & Musical Industries Limited, Hayes, England, a company of Great Britain Filed Dec. 14, 1956, Ser. No. 628,334

Claims priority, application Great Britain Dec. 16, 1955

4 Claims. (Cl. 178—5.4)

Figure 1:
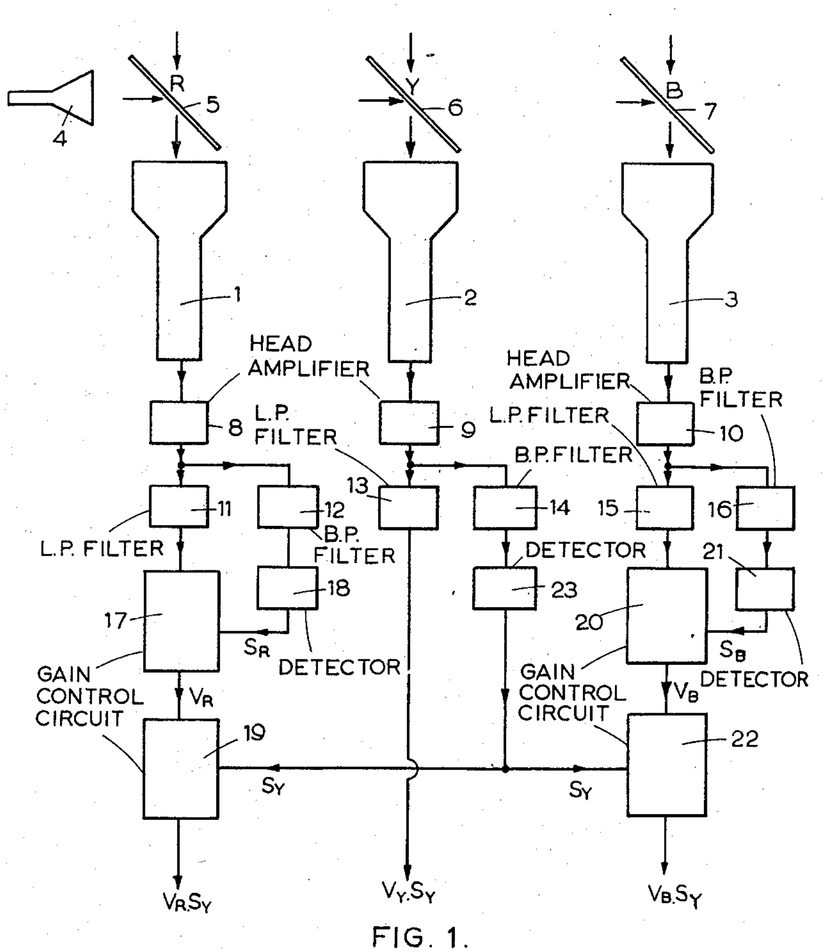

This invention relates to correcting for transmission variations in colour television channels.

Various proposals have been made for the correction of errors introduced in colour television systems by local variations in the transmission characteristics of the individual channels for the component signals. Such transmission variations may arise from variations in the sensitivity of different image translating devices in the channels, that is pick-up tubes, display tubes, storage tubes and the like, and to variations in the efficiency of optical systems, whereby the transmission characteristics of one or more of the channels may vary from one part of a television field to another. Some such proposals are described for example in co-pending United States application Serial No. 568,622, and co-pending British patent applications Nos. 32,398/55 and 33,665/55. In general, according to these proposals means are provided for producing a signal for each channel whose instantaneous value is a measure of the transmission of the channel, this signal being employed to control the gain of the respective channel and so compensate for variations in the transmission.

Such proposals are specially intended for reducing changes in hue in reproduced pictures arising from relative changes in the instantaneous transmission of the component colour signals. In colour systems three video signals are usually required and normally one of them predominantes in the luminance of the final picture. For instance in systems using R, G, B or R, Y, B analysis (where R, G, Y, B have the usual significance), the G or Y signals play a larger part in determining the final luminance than the R or B signals, and the G and Y signals are usually transmitted at higher definition than the R and B signals. In practice moreover it is found that a higher noise level can be tolerated on the R and B signals than on the G or Y signal.

The object of the present invention is to provide improved means for correcting for transmission variations in colour television channels, with a view to reducing the visibility of noise introduced as a result of correction.

According to the present invention there is provided colour television apparatus comprising at least two channels for different components of the colour television signals, one of which components has a larger luminance content than the other component, means for deriving signals representing transmission variations in said channels and means for modifying the transmission of the channel for said other component in response to the signals representing the transmission variations in both said channels, so as to reduce changes in hue in reproduced pictures arising from transmission variations in said channels.

By virtue of the present invention noise added by the correcting signals will thus appear only in channels where it produces less visible effect on reproduced pictures. Any brightness errors introduced by the invention will have little undesirable effect since they will be unaccompanied by hue changes.

Figure 2:
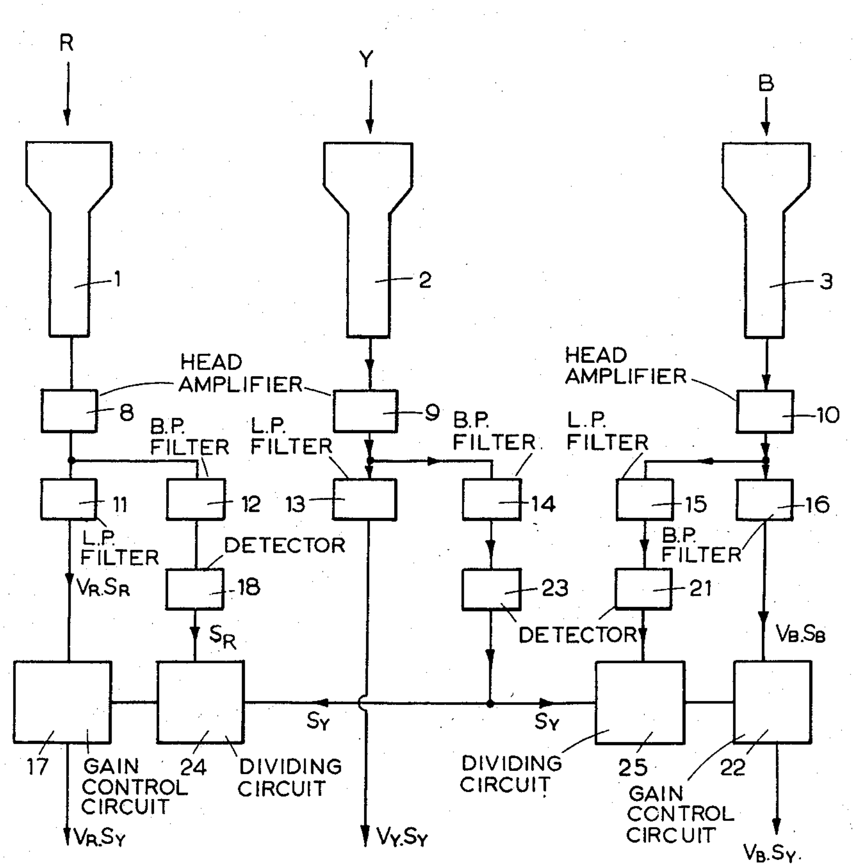

In order that the invention may be clearly understood and readily carried into effect, it will be described with reference to the accompanying drawings, in which:

Figure 1 illustrates one example of a so-called chromacoder embodying the present invention, and Figure 2 illustrates a modification of Figure 1.

Referring to Figure 1 it will be assumed that the chromacoder, which is only partly illustrated, is employed to derive simultaneous colour television signals from the output of a field sequential color television camera, the chromacoder being of the general construction described in United States application Serial No. 384,704. Thus the chromacoder comprises three pick-up tubes 1, 2 and 3 which can be of any suitable construction and are therefore shown only in outline. The pick-up tube 1 is exposed to a reproduction of the red (R) signal components derived by the camera and the pick-up tube 3 is exposed to a reproduction of the blue (B) signal components derived from a camera. On the other hand the pick-up tube 2 is exposed to Y signals which can be derived either directly from the camera or by combining in suitable proportions red, blue and green (G) signals derived from the camera. Reference 4 represents a cathode ray tube which operates as a so-called flying spot scanner, the beam in which is caused to trace a raster in approximate register with the scanning beam at the mosaic screens of the pick-up tubes 1, 2 and 3. The beam in the tube 4 is moreover switched on and off at very high frequency and the resultant intermittent light spot produced on the screen of the tube 4 is projected by the partly-silvered mirrors 5, 6 and 7 on to the mosaic screens of the tubes 1, 2 and 3. The light spot consequently generates in the output of each of the tubes 1, 2 and 3 a "photo-signal" which is virtually a carrier modulated by the sensitivity variations of the pick-up tubes 1, 2 and 3, the assumption being that the outputs are derived from electrodes in the tubes capacitively coupled with the respective mosaic screens.

The signals derived from the tubes 1, 2 and 3 are amplified in head amplifiers 8, 9 and 10 and the amplified signals from the respective amplifiers are applied in parallel to low pass filters 11, 13 and 15 and band pass filters 12, 14 and 16. In each case the low pass filter selects the video frequency signals whereas the band pass filter is arranged to select the carrier wave modulated by the sensitivity variations. This carrier wave will hereinafter be referred to as the sensitivity signal. The video signal derived from the low pass filter 11 is applied to a dynamic gain control circuit 17, said derived signal representing the red component of the scene being televised multiplied by an undesired signal due to sensitivity variations of the pick-up tube 1. For convenience said video signal is denoted as $V_R.S_R$. The signal derived from the band pass filter 12 is applied to a detector 18 and the output of the detector consists of a relatively low frequency signal representing the sensitivity variations by themselves. The latter signal, which is denoted by $S_R$ is applied to the circuit 17 to control the gain thereof in an inverse sense so as virtually to divide the signals $V_R.S_R$ by the signal $S_R$ so as to derive the desired signal $V_R$. The circuit 17 consists of a variable gain amplifier and will be termed a "dynamic gain control circuit" to indicate that the gain may be varied rapidly without introducing undesired signals into the output. The signals $V_R$ derived from the circuit 17 are applied to another dynamic gain control circuit 19 the function of which will be referred to subsequently.

The signal output of the low pass filter 15 in the circuit of the "blue" pick-up tube 3 represents the blue component signals of the scene being televised modulated by sensitivity variations due to the tube 3. This signal output is denoted as $V_B.S_B$ and is applied to a dynamic gain control circuit 20. The output of the band pass filter 16 is applied to a detector 21 to derive a sensitivity signal $S_B$ representing sensitivity variations of the tube 3 and is employed, as described in the case of circuit 17, to divide $V_B.S_B$ by $S_B$ to derive a corrected colour component signal $V_B$. This in turn is applied to a further dynamic gain control circuit 22, like 19.

The output of the low pass filter 13 in the Y channel of the apparatus, consists of the Y component signal modulated by sensitivity variations of the tube 2. This signal output which is denoted by $V_Y.S_Y$, is not applied to a dynamic gain control circuit as in the case of the signals from the pick-up tubes 1 and 3. On the contrary the signal output of the band pass filter 14, after detection in a detector 23 to produce the $S_Y$ sensitivity signal, representing the sensitivity variations of the tube 2, is applied in parallel to the further dynamic gain control circuits 19 and 20 in the R and B channels. There the signals $V_R$ and $V_B$ respectively are multiplied with the signal $S_Y$ to produce signals $V_R.S_Y$ and $V_B.S_Y$. By virtue of this arrangement, colour shadings due to sensitivity variations of the respective pick-up tubes can be substantially eliminated without worsening the signal-to-noise ratio of the Y signal by adding noise components appearing in the respective sensitivity signal. Alternatively for a given final noise level in the reproduced signal, the brightness of the exploring light spot may be reduced, which has attendant advantages.

In the modification of the invention shown in Figure 2 the further dynamic gain control circuits 19 and 22 are dispensed with and, instead, the $S_Y$ signal derived from the detector 23 is applied to dividing circuits 24 and 25 where it is divided by the sensitivity signals $S_R$ and $S_B$ respectively from the detectors 18 and 21. This produces sensitivity signals $S_Y/S_R$ and $S_Y/S_B$ and these are employed as the gain control signals for the circuits 17 and 22. The dividers 24 and 25 have the same basic function as the dynamic gain control circuits 9 and 24 but the dividing circuits may be of simpler design as both input signals in each case have restricted amplitude ranges and may be relatively low band width.

While the invention is not restricted as to the form of the dynamic gain control circuits 17, 19, 20 and 22, each of these circuits may for example consist of a balanced modulator, a gain controlled high frequency amplifier, and a synchronous detector arranged in succession. Taking the circuit 17 as representative, the video signal whose gain has to be controlled, that is, $V_RS_R$, is caused to modulate the amplitude of a carrier wave of say 15 mc./s. frequency in the balanced modulator, and the resultant side band components are then amplified in the amplifier while the gain thereof is controlled by the sensitivity signal $S_R$ which may include frequencies up to say 100 kc./s. The carrier wave is substantially suppressed in the modulator. The sensitivity signal may pass through a low-pass filter before application to the amplifier and the gain characteristic of the amplifier is chosen to be so curved that on applying the signal $S_R$ the effect is produced of multiplying $V_RS_R$ by $1/S_R$. The output of the amplifier, after filtering to remove low frequencies components due to $S_R$, is then synchronously detected to reproduce $V_R$ at video frequency.

The invention has been described as applied to an arrangement in which the sensitivity signals are derived in the manner described in United States application Serial No. 568,622. It is to be appreciated however that the invention is not confined to this manner of deriving the sensitivity signals and may be applied where the sensitivity signals are derived in other ways. For example, the sensitivity signal for each channel may be derived from a recorded signal representing the transmission variations which occur during a field or picture period of the system. The recording for each channel may be made by subjecting the respective pick-up tubes to a constant light stimulus, and recording the signal output of the tube, for example on a magnetic record, during a field or picture period of operation. Such an arrangement is described in co-pending patent application No. 33,665/55, and the apparatus disclosed in said application for recording and reproducing the signal representing the transmission variations is preferably employed, a recorded signal being of course reproduced once per field or picture period during operation of the respective channel for the transmission of signals. Moreover, when employing the arrangement of the last mentioned co-pending application to carry out the present invention, a separate recording of the transmission variations for the Y or G channel need not be made as it is possible to record directly, as the sensitivity signal for the red channel, the ratio $S_Y/S_R$ and to record directly for the blue channel the ratio $S_Y/S_B$.

Moreover, although the sensitivity signals in the arrangements described will represent mainly the area-variations in sensitivity of the mosaic screens in the pick-up tubes 1, 2 and 3, the manner of deriving the sensitivity signals may be such that the sensitivity signals represent transmission variations due to other causes, such as area-variations in the efficiency of the optical systems employed.

The invention is not confined in its application to chromacoders but may be applied to any multi-channel system employing correcting signals to compensate for transmission variations whatever the methods of generation or employment of the correcting signal, for instance television cameras, especially if such cameras employ more than one pick-up tube. For example, the pick-up tubes 1, 2 and 3 of the drawings may be the pick-up tubes of a colour television camera. If the invention is applied to a colour television camera, a preferred arrangement is to derive the sensitivity signals from recordings as indicated above.

What I claim is:

1. Colour television apparatus comprising at least two channels for different components of colour television signals, one of which components has a larger luminance content than the other component, the channel for the component of lesser luminance content including a variable gain amplifier, means for deriving a signal representing transmission variations of the channel for the component of greater luminance content, means for deriving a signal representing transmission variations of the channel for the component of lesser luminance content, and means for varying the gain of said amplifier in accordance with the ratio of said first derived signal to said second derived signal, to reduce hue errors in reproduced pictures arising from said transmission variations.

2. Colour television apparatus comprising a first signal channel for a signal component of relatively large luminance content, second and third signal channels respectively for signal components representing different colours of relatively small luminance content, said further channels respectively including variable gain amplifiers, means for deriving a signal representing transmission variations of said first signal channel, means for deriving signals respectively representing transmission variations of said second and third signal channels, means for varying the gain of said amplifier in said second channel in accordance with the ratio of the signal representing transmission variations in said first channel to the signal representing transmission variations in said second channel, and means for varying the gain of said third channel in accordance with the ratio of the signal representing transmission variations in said first channel to the signal representing transmission variations in said third channel.

3. Apparatus according to claim 1 wherein each of said channels including an image pick-up tube having a photoelectrically sensitive surface and means for deriving signals representing images presented to said surface to derive said component signals, and wherein said means for deriving signals representing transmission variations comprises means for presenting reference light stimuli to the photo-electrically sensitive surfaces of said pick-up tubes, and means for deriving signals from the respective pick-up tubes corresponding to said light stimuli.

4. Apparatus according to claim 3 wherein each pick-up tube includes an output electrode capacitatively associated with the respective photo-electrically sensitive surface, and comprising means for producing a light spot which fluctuates in intensity with constant amplitude, means for causing said spot to scan the photo-electrically sensitive surfaces in said pick-up tubes thereby to present reference light stimuli to said surfaces, the frequency of fluctuation of said spot being predetermined to produce photo-pulse signals at the respective output electrodes, and said means for deriving signals corresponding to said light stimuli include output circuits coupled to the respective output electrodes.

References Cited in the file of this patent

UNITED STATES PATENTS

| | | |
|---|---|---|
| 2,545,957 | Kell | Mar. 20, 1951 |
| 2,733,292 | Cope et al. | Jan. 31, 1956 |
| 2,854,504 | Lawrence | Sept. 30, 1958 |
| 2,866,847 | James | Dec. 30, 1958 |